(12) United States Patent
Bove, Jr.

(10) Patent No.: US 12,718,491 B2
(45) Date of Patent: Aug. 25, 2026

(54) METHOD FOR SOCIALLY-BASED NAVIGATION IN VIRTUAL EVENTS

(71) Applicant: Adeia Guides Inc., San Jose, CA (US)

(72) Inventor: V. Michael Bove, Jr., Wrentham, MA (US)

(73) Assignee: ADEIA GUIDES INC., San Jose, CA (US)

( * ) Notice: Subject to any disclaimer, the term of this patent is extended or adjusted under 35 U.S.C. 154(b) by 6 days.

(21) Appl. No.: 18/114,652

(22) Filed: Feb. 27, 2023

(65) Prior Publication Data

US 2024/0290041 A1 Aug. 29, 2024

(51) Int. Cl.

| | |
|---|---|
| ***G06T 19/00*** | (2011.01) |
| ***G06F 3/01*** | (2006.01) |
| ***G06F 3/16*** | (2006.01) |
| ***G06T 7/70*** | (2017.01) |
| ***G06T 19/20*** | (2011.01) |
| ***G06V 10/74*** | (2022.01) |
| ***G06V 10/762*** | (2022.01) |

(52) U.S. Cl.

CPC ............ *G06T 19/003* (2013.01); *G06F 3/016* (2013.01); *G06F 3/16* (2013.01); *G06T 7/70* (2017.01); *G06T 19/20* (2013.01); *G06V 10/761* (2022.01); *G06V 10/762* (2022.01); *G06T 2219/2004* (2013.01); *G06T 2219/2016* (2013.01)

(58) Field of Classification Search

CPC ......... G06T 19/003; G06T 7/70; G06T 19/20; G06T 2219/2004; G06T 2219/2016; G06F 3/016; G06F 3/16; G06F 3/011; G06V 10/761; G06V 10/762

USPC .......................................................... 345/419

See application file for complete search history.

(56) References Cited

U.S. PATENT DOCUMENTS

| | | | |
|---|---|---|---|
| 6,772,195 B1 | 8/2004 | Hatlelid et al. | |
| 8,171,408 B2 | 5/2012 | Dawson et al. | |
| 10,521,944 B2 | 12/2019 | Sareen et al. | |
| 10,979,752 B1 * | 4/2021 | Brody | H04N 21/25841 |
| 11,361,247 B2 | 6/2022 | Wolfson et al. | |
| 11,539,918 B1 * | 12/2022 | Libin | H04L 12/1827 |
| 11,700,354 B1 * | 7/2023 | Krol | G06F 3/04815 348/14.08 |
| 11,741,664 B1 * | 8/2023 | Swanson | H04N 7/157 345/419 |

(Continued)

OTHER PUBLICATIONS

F. Kappe, B. Zaka and M. Steurer, "Automatically Detecting Points of Interest and Social Networks from Tracking Positions of Avatars in a Virtual World," 2009 International Conference on Advances in Social Network Analysis and Mining, Athens, Greece, 2009, pp. 89-94, doi: 10.1109/ASONAM.2009.66. (Year: 2009).*

*Primary Examiner* — Sheree N Brown
(74) *Attorney, Agent, or Firm* — HG LAW LLP

(57) ABSTRACT

Systems and methods for navigation in a 3D virtual environment are provided. In an embodiment, a method includes displaying an avatar in a first position of a 3D virtual environment and identifying a cluster of avatars in the 3D virtual environment. In an embodiment, the method may include, in response to receiving a user interface input request to place the avatar into the cluster of avatars, identifying an identified unoccupied position in the cluster, and repositioning the avatar from the first position of the 3D virtual environment to the identified unoccupied position in the cluster.

19 Claims, 11 Drawing Sheets

(56) References Cited

U.S. PATENT DOCUMENTS

| | | | | |
|---|---|---|---|---|
| 2008/0075118 | A1* | 3/2008 | Knight | H04L 12/1822 370/474 |
| 2016/0286275 | A1* | 9/2016 | Maeda | G06Q 30/0631 |
| 2018/0315134 | A1* | 11/2018 | Amitay | G06Q 10/40 |
| 2020/0084133 | A1* | 3/2020 | Haggar | H04L 47/822 |
| 2022/0004254 | A1* | 1/2022 | Roberts | H04N 21/234363 |
| 2022/0124285 | A1* | 4/2022 | Punwani | G06F 3/04815 |
| 2023/0085162 | A1* | 3/2023 | Gal | H04L 51/043 709/206 |
| 2024/0127544 | A1* | 4/2024 | Fox | G06T 7/60 |

* cited by examiner

METHOD FOR SOCIALLY-BASED NAVIGATION IN VIRTUAL EVENTS

BACKGROUND OF THE INVENTION

One or more embodiments of the present disclosure relate to methods and systems for navigating through a virtual environment, and more particularly, identifying clusters of avatars and enabling a user to jump to a selected cluster. Some embodiments or aspects may relate to other features, functionalities, or fields.

SUMMARY

Recently, 3D virtual events have become more and more common because they allow participants to experience events without needing to be physically present. Example events can include concerts, art exhibitions, theatrical performances, sporting events, conferences, shopping malls, and more. Participants can attend these events through virtual reality (VR) headsets, which provide a 3D experience, or through an ordinary 2D display. In either case, the participant controls an avatar within the 3D virtual environment, navigating within the 3D virtual environment by interacting with a user interface.

Some 3D virtual environments can be relatively large and complex, including many different areas, rooms, or other navigable regions. Additionally, some 3D virtual environments may be populated with avatars from many different users at the same time, resulting in a crowded environment. As a result, the user's view of the environment (either using 3D glasses or via a 2D screen) can be obstructed by avatars and objects within the environment, making it difficult to navigate. Furthermore, the user interface with which the user interacts to navigate through the 3D environment may have limited functionality in that the user cannot easily filter through or jump between different groups of users. In particular, the view of an avatar within the 3D environment may be limited, such that only avatars and groups of avatars within a line of sight of the avatar are known to the user, and there may be no information at all about groups that are not directly visible, and/or no information about the event or object of interest on which the group is focused. Thus, even if the avatar is able to join the group, the user may still be confused about the event, object of interest, and/or direction of focus of the members of the group.

With these challenges in mind, some embodiments of the present disclosure provide user interface elements that may enable user to better identify and jump between clusters of avatars within the 3D environment, even if the clusters are not directly visible to the avatar via line of sight. Embodiments may also automatically orient the avatar toward the event or object of interest based on other avatars in the cluster, so as to seamlessly join in the experience of the rest of the cluster.

In one example, a method includes identifying one or more clusters of avatars within the 3D environment. Clusters may be identified based on detection of a certain density of avatars in a given area, detection of a certain number of avatars present in a room or region, or via some other technique. The method may then include providing a user interface element that may include an option to browse the identified clusters, view more information about identified clusters, and learn more about the events or objects to which the identified clusters correspond.

The user can then select a cluster and jump to the selected cluster. The process of jumping to the cluster (also referred to as "repositioning") can include identifying one or more unoccupied positions either inside the selected cluster or on the edge of the selected cluster, and determining a respective view of an avatar when positioned in the one or more unoccupied positions. This enables the user to see a preview of the view their avatar may have when joined into the cluster, before the user decides to actually move into the cluster. The method may then include receiving a user input selecting one of the unoccupied positions, and, in response, repositioning the user's avatar into the selected unoccupied position, with an orientation determined based on the other avatars in the cluster. For example, the orientation of the avatar may be determined based on the orientation of the other avatars in the cluster, or based on a position of an event or object of interest corresponding to the cluster.

In some examples, the unoccupied position into which the avatar jumps may be in a middle or interior portion of the cluster, while in other examples the unoccupied position may be on an edge or periphery of the cluster. In still other examples, the user interface may indicate that one or more clusters are available to join, a direction and/or distance to each cluster, the event or object of interest to which each cluster corresponds, whether one or more members of the cluster are known to the user, and more. In addition, the user interface may be configured to present information and receive various inputs via physical button(s), speaker(s) and/or microphone(s), inertial sensors or gesture detection, and more.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

As noted above, navigation within a 3D virtual environment can be difficult when the environment has many members or avatars present. In particular, users may find it difficult to navigate between events and/or within the 3D virtual environment using some user interfaces, which can be complicated and non-intuitive. Users may navigate their avatars within the 3D virtual environment using a game-controller style device (either using a joystick or gesture controls), using a keyboard and mouse, or using a touch-screen.

In some embodiments of the present disclosure, users can control their avatars to navigate through the large, complex 3D virtual environment using information about events and objects of interest that other users and avatars have found interesting. Embodiments of the present disclosure provide intuitive user interface elements that enable a user to quickly determine where other users are present in groups or clusters, and to select and join a cluster.

Embodiments of the present disclosure describe a virtual navigation application that displays an avatar in a first position within the 3D virtual environment. The 3D virtual environment includes one or more clusters of avatars, and the user may wish to obtain information about these clusters and ultimately decide to join a selected cluster. The virtual navigation application identifies the one or more clusters of avatars and presents information about the clusters to the user via one or more user interface elements. The user may then select a cluster to join, and the virtual navigation application may responsively reposition the user's avatar in the selected cluster. In some embodiments, the virtual navigation application also orients the avatar within the joined cluster based on the other avatars of the cluster, such that the user's avatar is automatically oriented toward the event or object of interest that the other avatars are already viewing.

Figure 1A:
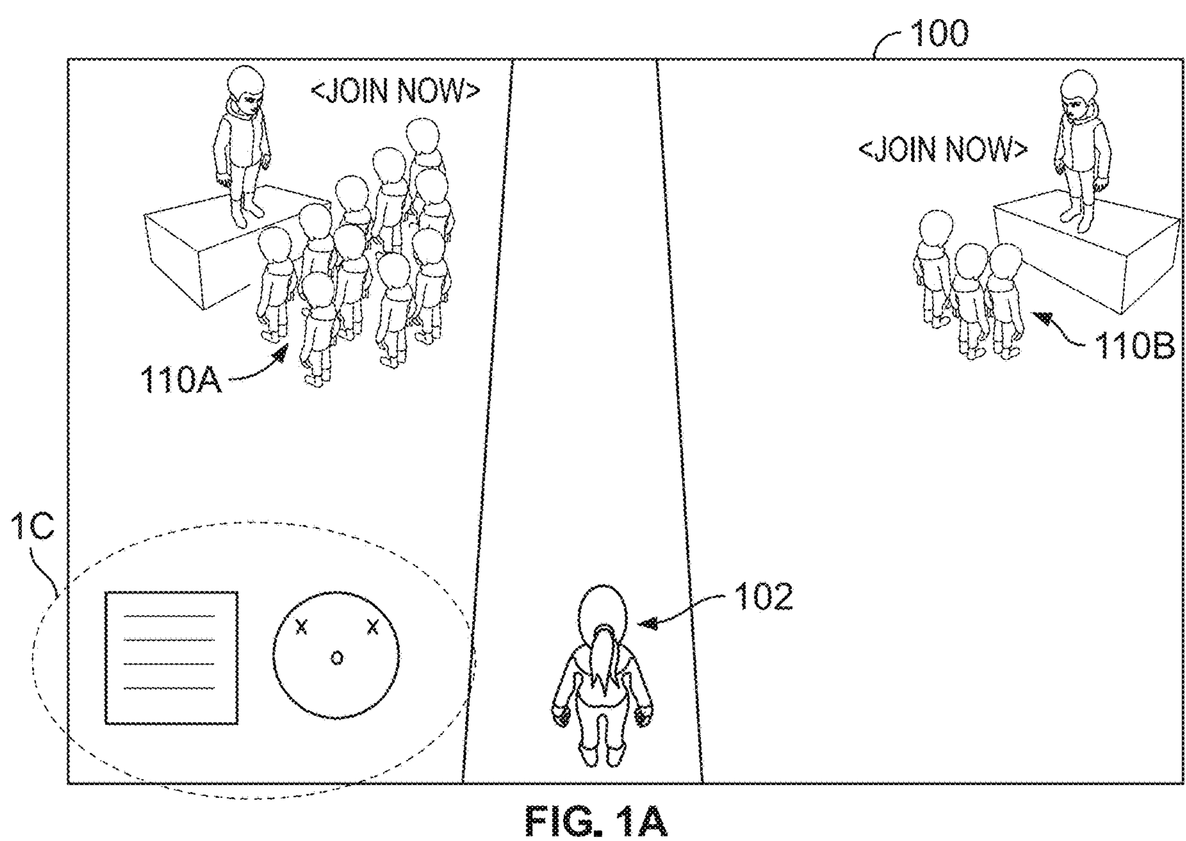
FIGS. 1A and 1B show example displays of an avatar in a 3D virtual environment, illustrating the position of the avatar before and after the avatar joins a cluster, in accordance with some embodiments of this disclosure.
Figure 1B:
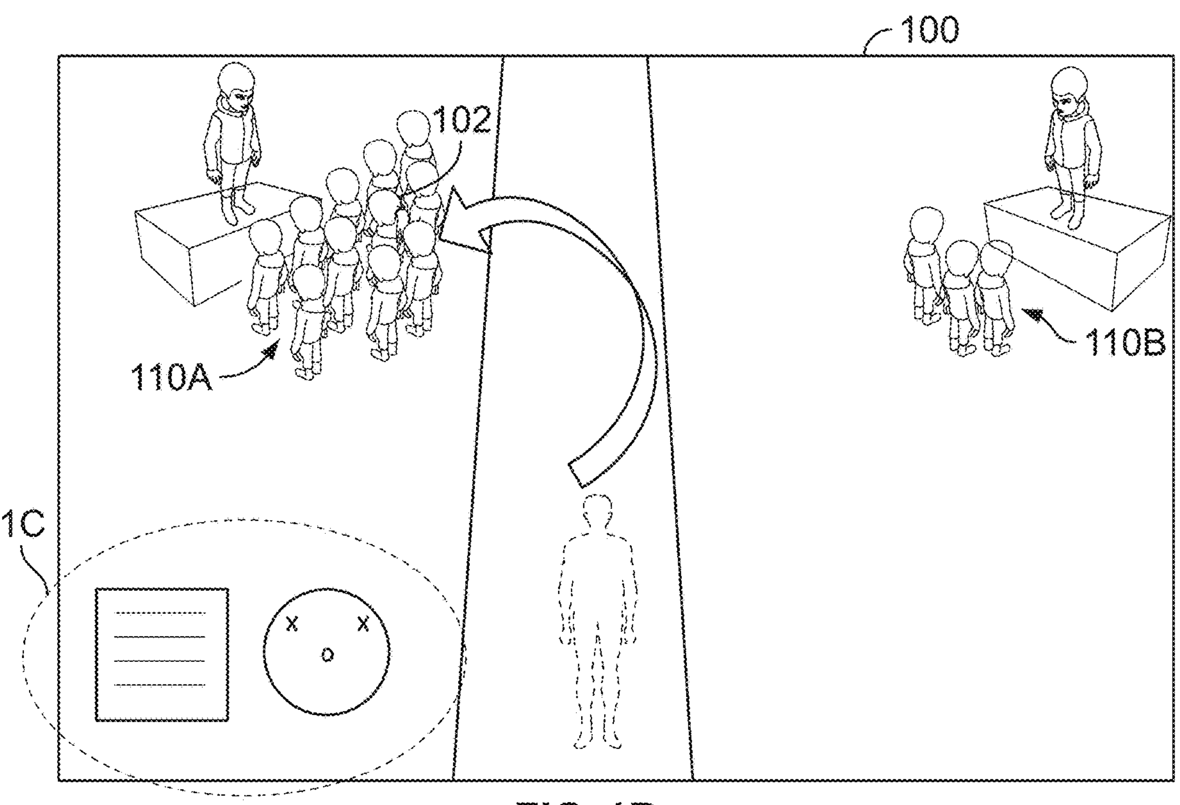

FIGS. 1A and 1B illustrate example displays 100 of an avatar 102 in a 3D virtual environment, before (FIG. 1A) and after (FIG. 1B) the avatar 102 has been repositioned within the cluster 110A. FIGS. 1A and 1B illustrate a 2D display of the 3D virtual environment (i.e., as would be seen on a computer monitor). However, it should be appreciated that the concepts and features disclosed herein also apply to an artificial reality (AR) headset, virtual reality (VR) headset, merged or mixed reality (MR) headset, extended reality (XR) headset (which, generally speaking, is a catch-all term that encompasses AR, VR, and MR implementations), or any other suitable display mechanism for a 3D virtual environment.

FIG. 1A shows the avatar 102 of the user positioned centrally at a bottom of the display 100. FIG. 1A also shows a first cluster 110A and a second cluster 110B, positioned off into the distance with respect to avatar 102. The virtual navigation application may be configured to present a user interface element "<JOIN NOW>" next to the clusters 110A and 110B, inviting the user to select a cluster to join. The virtual navigation application also includes additional user interface elements (shown in further detail in FIG. 1C), which may provide additional techniques for enabling the user to select and join a cluster. These are discussed in further detail below.

After user input is received selecting the first cluster 110A (e.g., via selection of the "<JOIN NOW>" icon), the avatar 102 may be repositioned within the cluster 110A, as shown in FIG. 1B. FIG. 1B shows a ghost outline of the avatar 102 at the bottom of the display 100, and the avatar 102 repositioned within the interior of the cluster 110A. As can be seen, typical movement of the avatar 102 within the 3D environment (e.g., via walking) would not allow the avatar 102 to join the cluster 110A at an internal position of the cluster. That is, all traversable paths using the regular or standard movement mechanism within the 3D virtual environment from the first position of FIG. 1A to the cluster position of FIG. 1B are blocked by other avatars. The virtual navigation application thus may be understood in some embodiments as teleporting the avatar into the cluster 110A. Put another way, the features disclosed herein operate even when the avatar 102 cannot move to an unoccupied position within the selected cluster using normal movement, and even in circumstances where there is no traversable path from the first position to the unoccupied position in the cluster.

It should be appreciated that the view shown in FIG. 1B is not what a user would see in this circumstance. Rather, the view of FIG. 1B is included in this disclosure to better illustrate the movement of the avatar 102 when it is joined to a cluster.

Figure 1C:
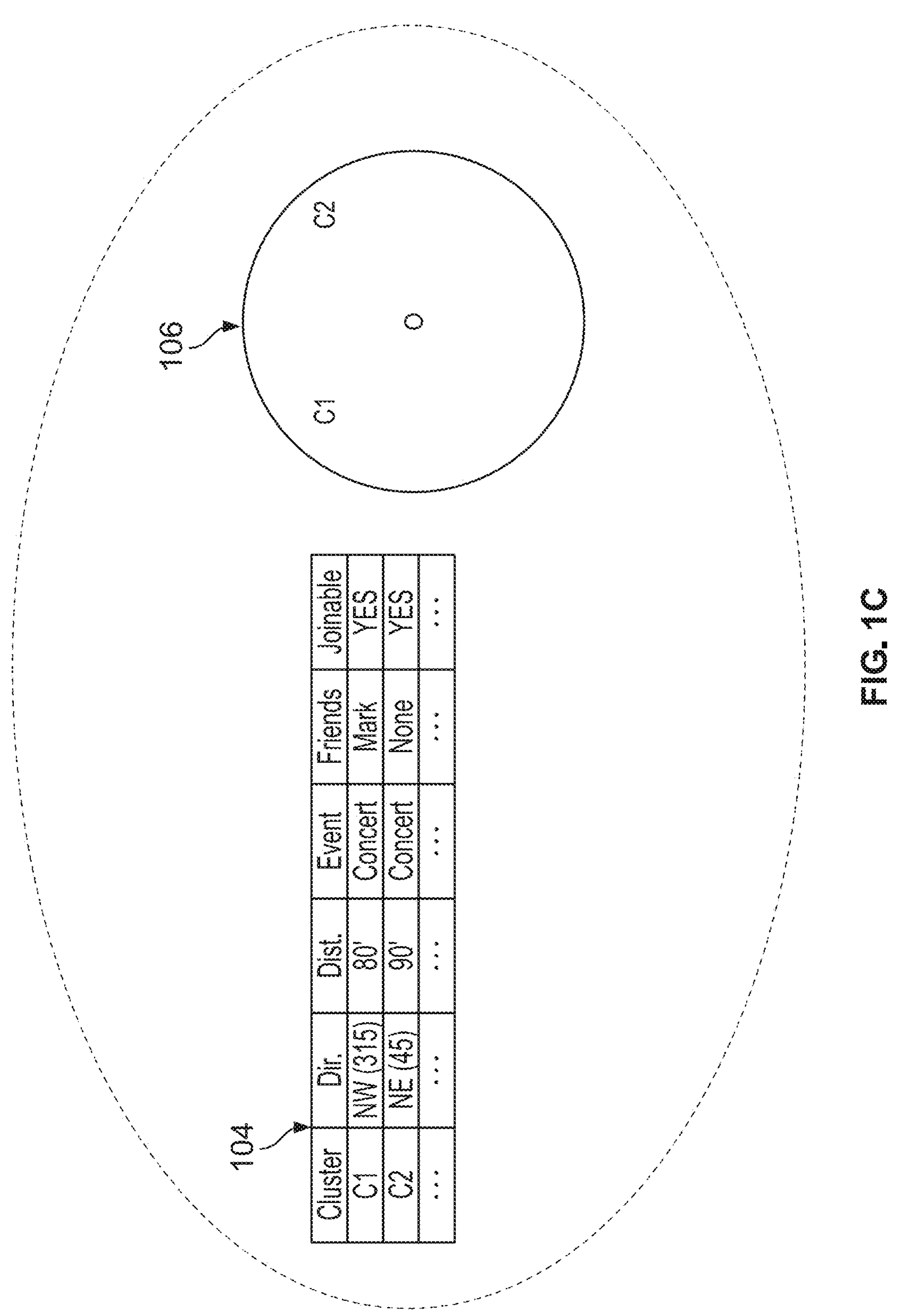
FIG. 1C is zoomed in view of a user interface element displayed in FIGS. 1A and 1B, showing a list and an overhead map view of available clusters, in accordance with some embodiments of this disclosure.

FIG. 1C illustrates an example zoomed in view of user interface elements 104 and 106 displayed in FIGS. 1A and 1B. User interface element 104 is a list of clusters, and user interface element 106 is an overhead map view 106 of clusters within the 3D virtual environment. The virtual navigation application may provide the user interface element 104 in the form of a list that details various information about one or more clusters. The information can include a cluster identifier (e.g., C1, C2 . . . ), a direction from a current avatar position, a distance from the avatar position, an event or object of interest associated with the cluster, a list of friends or contacts which are a part of the cluster, whether the cluster is currently joinable, and more. The virtual navigation application may also provide a more visual user interface element 106, shown in FIG. 1C as an overhead radar or map view. The avatar position is denoted by a "O" in the center of the element 106, and the clusters are illustrated as C1 and C2 in their respective positions relative to the avatar position. As the avatar moves or rotates within the 3D virtual environment, the position of the indicators C1 and C2 may change as well. Additionally, as the avatar moves or rotates within the 3D environment, and as other avatars move and join/leave clusters, the list and map view may update to reflect the dynamic environment. For instance, as a new cluster forms, the new cluster may be added to the list as C3, and an identifier may be placed on the map 106.

It should be appreciated that the illustrated user interface elements are included for illustration of the concepts of this disclosure only, and should not be read as limiting the scope of the disclosure. Many other types of user interface elements may be used to convey various information about the clusters.

In an example embodiment, the virtual navigation application is configured to generate for display an avatar in a first position of a 3D virtual environment. As noted above, the 3D virtual environment may be an AR, VR, XR, or other type of 3D virtual environment. Additionally, the user may view the 3D virtual environment using a 3D headset, a 2D screen, or via any other suitable display.

Figure 2:
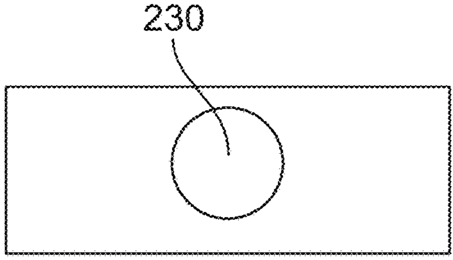
FIG. 2 shows a simplified diagram of an example cluster of avatars having an unoccupied position within a 3D virtual environment, in accordance with some embodiments of this disclosure.
Figure 2:
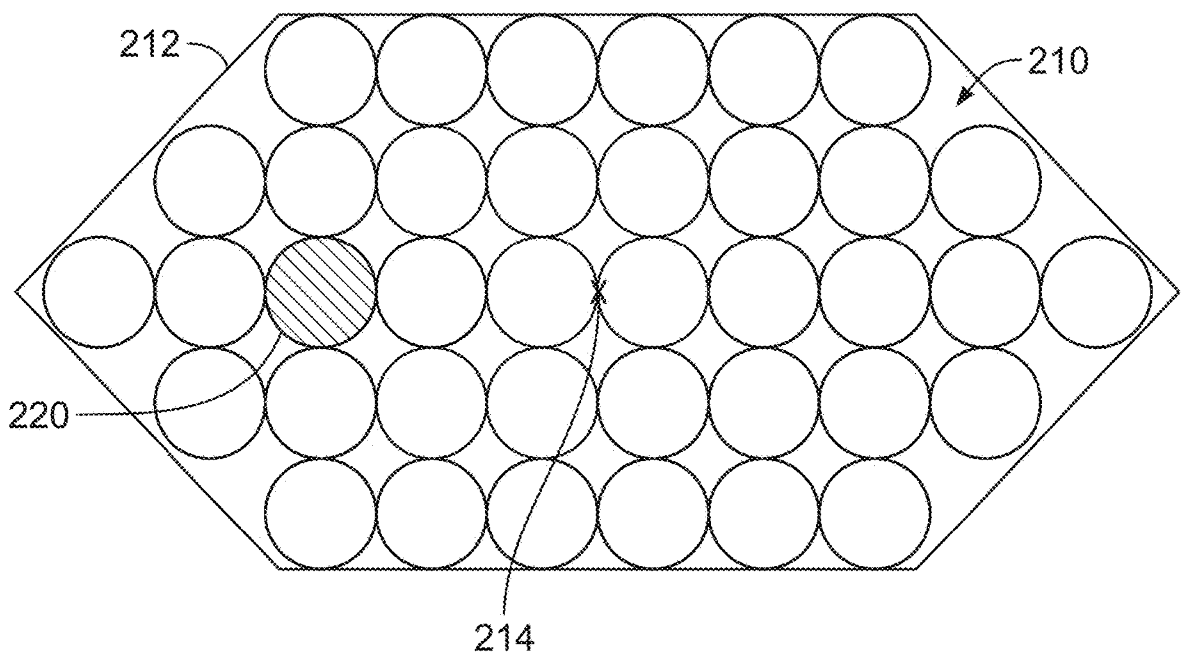
Figure 3:
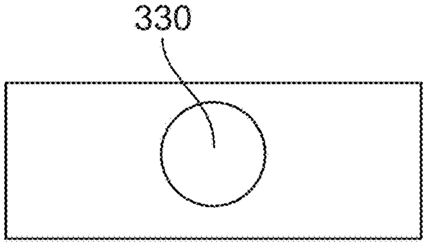
FIG. 3 shows a simplified diagram of another example cluster of avatars having an unoccupied position within a 3D virtual environment, in accordance with some embodiments of this disclosure.
Figure 3:
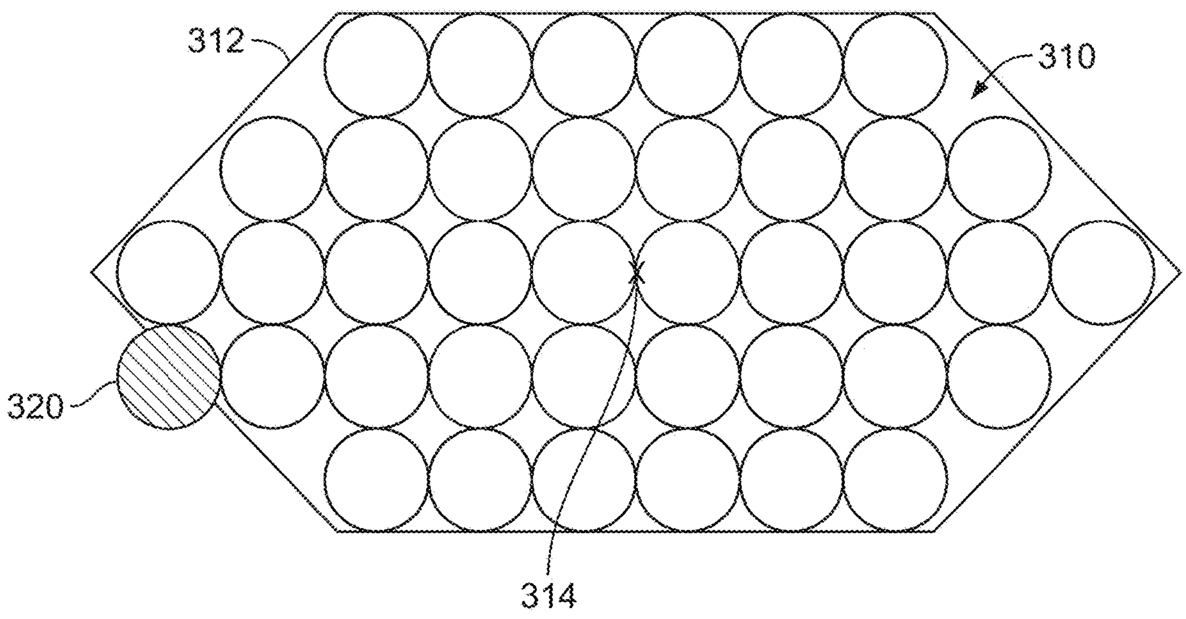
Figure 4:
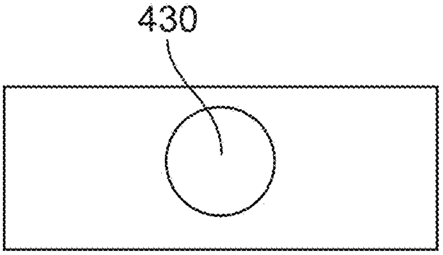
FIG. 4 shows a simplified diagram of another example cluster of avatars having multiple unoccupied positions within a 3D virtual environment, in accordance with some embodiments of this disclosure.
Figure 4:
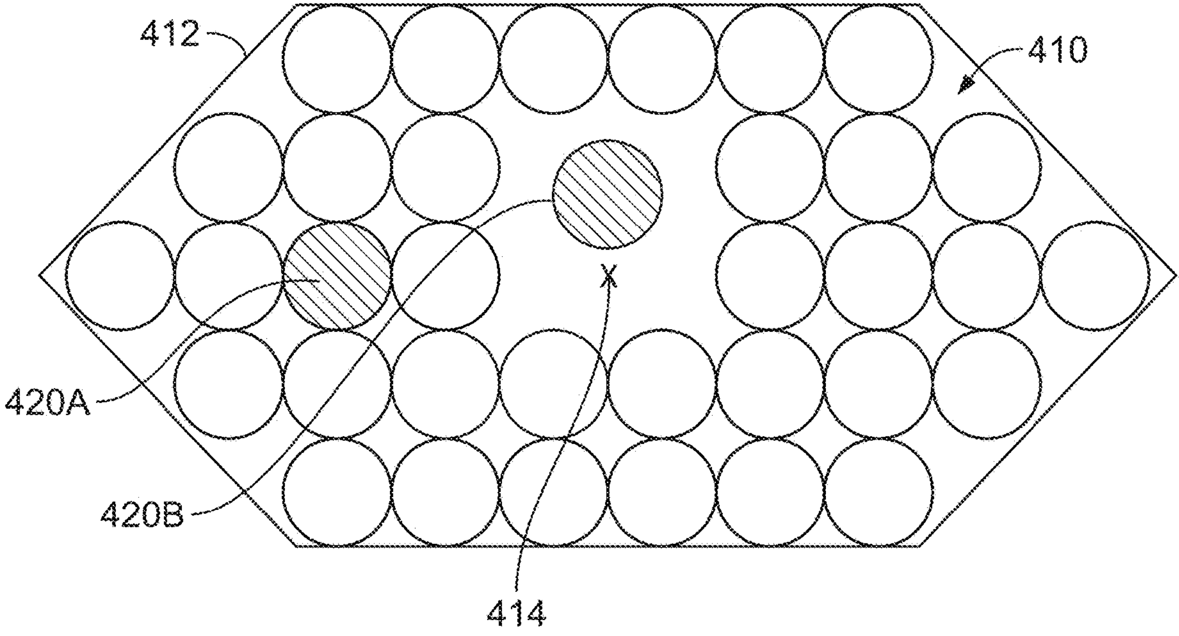

The virtual navigation application is also configured to identify one or more clusters of avatars in the 3D virtual environment. For example, clusters 110A, 110B, 210, 310, 410, 510, 610, 710A, and 710B in FIGS. 1-7. The virtual navigation application may identify the clusters using one or more algorithms, including, but not limited to, Mean-Shift Clustering, Density-Based Spatial Clustering of Applications with Noise (DBSCAN), and Expectation Maximization (EM) using Gaussian Mixture Models. These methods may find locally dense areas of data points and create a list of points belonging to each cluster. A cluster may be represented in a variety of ways. For example, since each avatar in a cluster has at least X and Y coordinates designating its position, some techniques create a bounding polygon for a list of coordinates in a cluster using "convex hull" methods. Other boundary descriptions such as a minimum bounding box or ellipsoid may alternatively or additionally be computed. A centroid for the cluster can also be calculated using various methods. Bounding polygons 212, 312, 412, 512, and 612 are shown in FIGS. 2-6. Centroids 214, 314, and 414 are shown in FIGS. 2-4.

In one example, the virtual navigation application identifies a cluster of avatars by identifying an area of the 3D virtual environment with a certain threshold density of avatars, surrounded by a less dense region. For instance, 10 avatars positioned within a 5×5 grid of possible avatar positions, wherein the 5×5 grid is surrounded by five empty grid positions on each side. This is one example of a cluster, and it should be appreciated that other thresholds and densities may be used instead.

In some examples, the virtual navigation application may identify one or more clusters based on user preferences. In some cases, there may be too many possible clusters to enable the user to effectively navigate. In these cases, the virtual navigation application may select only certain clusters based on the user's preferences. On the other hand, in some cases a grouping of avatars may ordinarily constitute or be identifiable as a cluster, but the virtual navigation application may determine that the grouping of avatars should not be identified as a cluster based on the user's preferences. For example, user preferences can include (a) a preferred event type, (b) a blocked event type, (c) a preferred object of interest type, (d) a blocked object of interest type, (e) a preferred avatar, friend, or user, (f) a blocked avatar, friend, or user, (g) a preferred minimum spacing between members of the cluster, (h) a preferred feature associated with the cluster (e.g. common group affiliation of some members of the cluster), (i) a timing of an event associated with the cluster (e.g., event about to start, just started, scheduled for X time, etc.), (j) a room size associated with the cluster or event, (k) a distance to the cluster (e.g., only identifying clusters within X distance), (l) whether a cluster is within a line of sight of the avatar, and more.

In addition to identifying the clusters, the virtual navigation application may also identify various information about the clusters. This information can include (a) the direction to the cluster, (b) the distance to the cluster, (c) the event, if any, associated with the cluster, (d) the object of interest on which members of the cluster are focused, if any, associated with the cluster, (e) the members, avatars, or users that are part of the cluster, (f) any timing information associated with the cluster (e.g., when the cluster was created), (g) positional information about the cluster (e.g., whether the cluster moved from some other location), and more.

In some examples, the virtual navigation application is configured to determine the direction and distance from the avatar to the one or more clusters in order to visually indicate where the clusters are with respect to the user. This can include the virtual navigation application displaying an indicator for the identified clusters on the display (e.g., "<JOIN NOW>"). The direction and distance to a cluster may be determined based on a centroid of the cluster, a bounding polygon of the cluster, an edge of the bounding polygon, a position of a nearest member of the cluster, or using any other suitable information or technique.

In some examples, the virtual navigation application is configured to generate for display a user interface element indicating that the cluster is available to join. The virtual navigation application may generate for display the user interface element in response to identifying a cluster of avatars in the 3D virtual environment. For example, FIGS. 1A and 1B illustrate a user interface element displaying "<JOIN NOW>". This user interface element may be selectable by a user via clicking, tapping, looking at, or otherwise interacting with the user interface. FIG. 1C illustrates a user interface element in the form of list 104, which may include user-selectable buttons or icons. Additionally. User interface element 106 includes user-selectable icons C1 and C2 which correspond to clusters 110A and 110B. In some examples, the user interface element may be an element within the 3D virtual environment above or near to the cluster. For instance, a user viewing the 3D virtual environment with a VR headset may be presented with a selectable icon displayed within the 3D virtual environment above a cluster. In some examples, there may be an audio or sound output indicating that one or more clusters are available to join. In some examples, spatial sound may be applied to cause the audio cue to come from the direction or directions toward the available cluster or clusters. Further, in some examples there may be a tactile or haptic output (e.g., shaking, buzzing, etc.) indicating that one or more clusters are available to join.

In some examples, the virtual navigation application may also be configured to receive a user interface input selection of an identified cluster. As noted above, the user input selection may include a selection of a displayed button or icon (e.g., "<JOIN NOW>"), the selection of a cluster from the list 104, from the map 106, or via input from a button on a controller (e.g., joystick). In other examples, the selection of an identified cluster may include selection by movement of the avatar orientation or view. For example, the user may rotate the avatar's view to look directly at one cluster (e.g., cluster 110A), and the virtual navigation application may receive that movement as an input selection of the cluster 110A. Alternatively, if the user rotates the avatar's view to look at cluster 110B, the virtual navigation application may receive that input as a selection of cluster 110B. The virtual navigation application may determine that the cluster most closely aligned with the view direction of the avatar is the selected or identified cluster. In some examples, the cluster may be selected via movement of a 3D headset, and thereby movement of the view direction or orientation of the avatar.

In some examples, the virtual navigation application identifies the selected cluster based on a position and orientation of avatar and a centroid of cluster. For example, the virtual navigation application may select the cluster that has a centroid (or bounding polygon, edge member, etc.) that is most directly in line with the avatar view direction. For instance, where a first cluster is off to the left by 30 degrees from the view direction of the avatar, and a second cluster is off to the right by 45 degrees, the virtual navigation application may interpret the orientation of the avatar as a selection of the first cluster. The virtual navigation application may determine the cluster most closely aligned with the current view direction of the avatar, without additional input from the user (i.e., the user need not provide any input, and the virtual navigation application automatically determines the cluster to jump to based on the current view direction of the user).

In some examples, the virtual navigation application may receive a selection of a cluster by voice or sound input (e.g., the user says "join cluster one). In other examples, the virtual navigation application may receive a selection of a cluster by detecting shaking or movement of a controller, headset, or other user input device. For example, a user using a VR headset and hand-held controllers may select a cluster by gesturing toward a cluster. In some examples, a user may use a combination of inputs to select a particular cluster. For example, the user may orient the avatar's view toward a cluster, and select the cluster by making a gesture, clicking a button, or otherwise interacting with a user interface element or controller. In another example, a user using a game controller may move a joystick in the direction of a cluster (i.e., a directional input), and also press another button on the controller to select the cluster. These inputs may be separate from the view direction of the user. As such, the avatar may be oriented to have a view direction in a first direction, and the user may input a different direction to select a cluster (e.g., left joystick input, without changing the avatar orientation or view direction).

In some examples, the virtual navigation application is configured to receive a user interface input request to place the avatar into the cluster of avatars. The request to place the avatar into the cluster of avatars (i.e., to join the cluster) may be part of or may be different from the selection of the cluster itself. In other words, the user may make a single input which both selects the cluster and indicates that the user wants to join the cluster, and no further user input is needed to place the avatar within the cluster. Alternatively, the user input to select a cluster may be distinct from the user input to request placement of the avatar in the cluster. The user input to join the cluster may be the same as the user inputs described above, including for example selection of a button, movement of the avatar orientation, movement of the avatar view, gesture with a controller, an audio input, and more.

In some examples, the virtual navigation application may be configured to identify one or more unoccupied positions in a cluster. The unoccupied positions can be in an interior portion of the cluster (e.g., as shown in FIG. 2), or may be on an edge of the cluster (e.g., as shown in FIG. 3). If the virtual navigation application determines that there are no suitable unoccupied positions in an interior of the cluster, the virtual navigation application may select a position on the periphery of the cluster as an unoccupied position in the cluster.

In some examples, the 3D virtual environment may be presented in a way that includes a grid system, wherein positioning of avatars in the 3D virtual environment is on the grid. In this case, the virtual navigation application may identify the one or more unoccupied positions in the cluster by determining one or more grid positions in or around the cluster that do not have an avatar present.

In other examples, the 3D virtual environment may have a less rigid system, wherein positioning of the avatars is less strict. In these cases, the avatars may be positioned more freely, and may instead have an X and Y coordinate (and maybe also a Z coordinate) along with an inaccessible radius or buffer zone surrounding the avatar. This buffer prevents avatars from being positioned too close together, from overlapping, and from passing through each other when they move within the 3D virtual environment.

In some examples, the unoccupied positions in the cluster can change size dynamically based on various factors such as movement of avatars, avatars joining or leaving the cluster, avatars logging out entirely from the 3D virtual environment, and more. Additionally, unoccupied position sizing can be different from cluster to cluster based on the event type, the minimum boundary around each avatar in the cluster, the different avatar sizes of avatars in the cluster, user preferences associated with avatars in the cluster, and more.

In some examples, identifying an unoccupied position includes determining regions within the bounding polygon of a cluster having X and Y dimensions that are greater than or equal to the minimum avatar spacing. See, for example, position 220 in FIG. 2. In one example, the virtual navigation application may determine the unoccupied positions using quadtree computational algorithms, where any region whose subdivision stops at dimensions greater than the minimum avatar spacing would be marked as occupiable. Once an avatar is added to that region, only that region needs to be recomputed in the quadtree. It should be appreciated that this is merely one example, and that other computational methods are contemplated in this disclosure. If the virtual navigation application determines that there are no unoccupied locations within a given cluster, the virtual navigation application may generate a list of unoccupied positions contiguous with (e.g. on the periphery of) the cluster. See, for example, position 320 in FIG. 3. In some embodiments, spaces within a cluster may also be marked as unoccupiable because they contain some feature of the environment that the environment's creator has designated as not able to be occupied by an avatar. This may be, for example, a tree, rock, wall, or other structure.

In some examples, each avatar may have a predefined size or spacing requirement (e.g., buffer zone) that other avatars cannot enter. The virtual navigation application may identify an unoccupied position by determining if any space internal to the cluster (e.g., within the bounding polygon) has the size requirements to insert the avatar with the required spacing. This determination may be different for each avatar based on the avatars' specific spacing requirements or preferences. For example, a given user may have a preferred spacing requirement that is different from the default spacing requirements, so the virtual navigation application may factor in the user spacing preference when identifying an unoccupied position. As a result, some cluster positions may be deemed inaccessible if they do not meet the user's greater spacing or proximity requirements, even if a different avatar (or avatar with default settings) could be positioned in those cluster positions.

In some examples, the virtual navigation application may identify two or more unoccupied positions, and rank the positions according to one or more factors. FIG. 4 shows cluster 410 with bounding polygon 412, centroid 414, first unoccupied position 420A, and second unoccupied position 420B. Second unoccupied position 420B has a larger size than the first unoccupied position 420A, and also has a more direct view of the performer 430. As a result, the second unoccupied position 420B may be ranked higher than the first unoccupied position 420A.

The virtual navigation application may rank the unoccupied positions based on user preferences, such as spacing, viewing angle, proximity to the event of object of interest, and proximity to friends. For example, where two positions are both unoccupied and large enough to meet the required avatar spacing, the larger of the two positions may be ranked higher than the smaller of the two positions. Additionally, a position with a better viewing angle (i.e., more direct or central with respect to the event or object of interest) may be ranked higher than a position with a worse viewing angle (i.e., less direct or central). Further, a position closer to the event or object of interest, or closer to an avatar on the user's friends list, may be ranked higher than a position farther away from the event, object of interest, or friend. In some examples, the virtual navigation application may rank positions within the cluster that have most recently been vacated higher than other positions. This may reduce the computational load required, since some or all of the calculations required to determine the cluster, positions, and orientations may have already been calculated for the just-vacated avatar. Many other factors may be used as well in ranking the unoccupied positions.

In some examples, after the multiple unoccupied positions are ranked, the virtual navigation application may automatically select the top ranked position to be the position filled by the user's avatar. In other examples, the virtual navigation application may present the multiple positions to the user (e.g., the top three, five, or some other number), and the user may select between the multiple positions. This can include the virtual navigation application presenting a preview of one or more of the multiple unoccupied positions, as discussed in further detail below with respect to FIG. 7.

In some examples, the virtual navigation application may determine multiple unoccupied positions over time. As each additional unoccupied position is determined, the ranking of the positions may be updated dynamically.

Figure 5A:
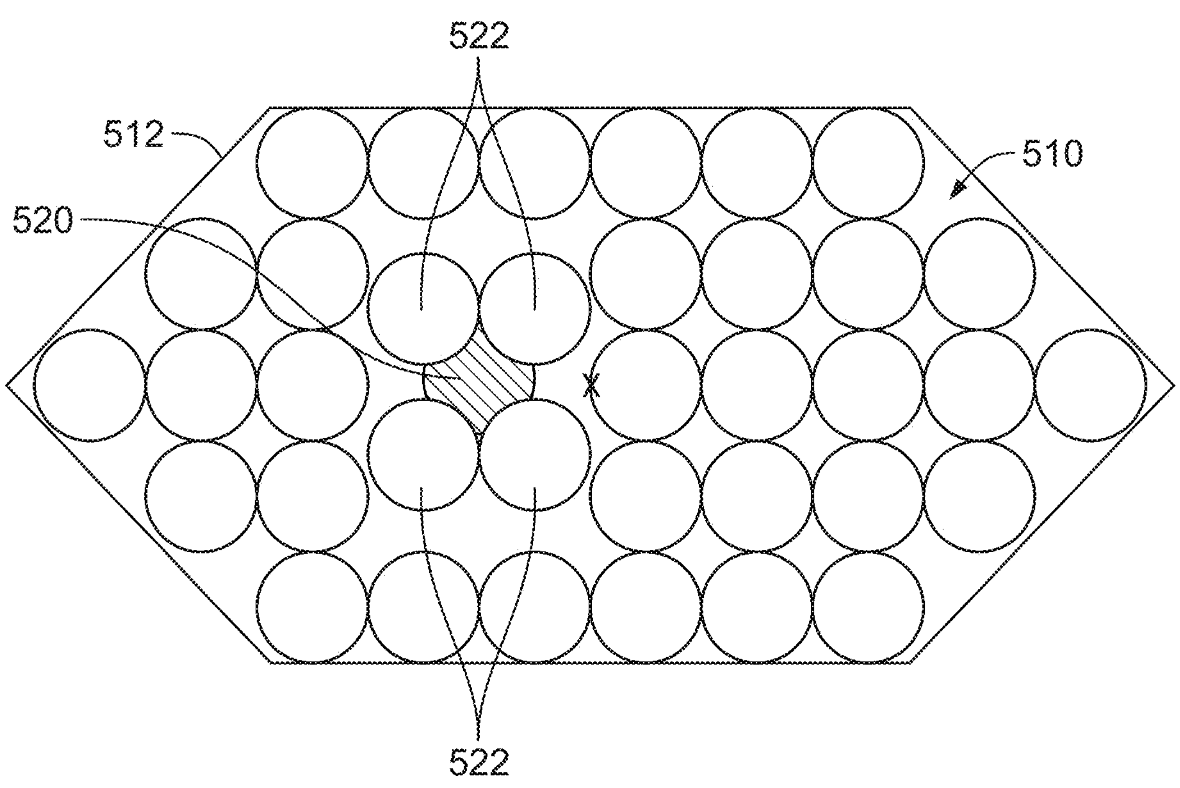
FIGS. 5A and 5B show simplified diagrams of another example cluster of avatars, wherein an unoccupied position is created by moving adjacent avatars within a 3D virtual environment, in accordance with some embodiments of this disclosure.
Figure 5B:
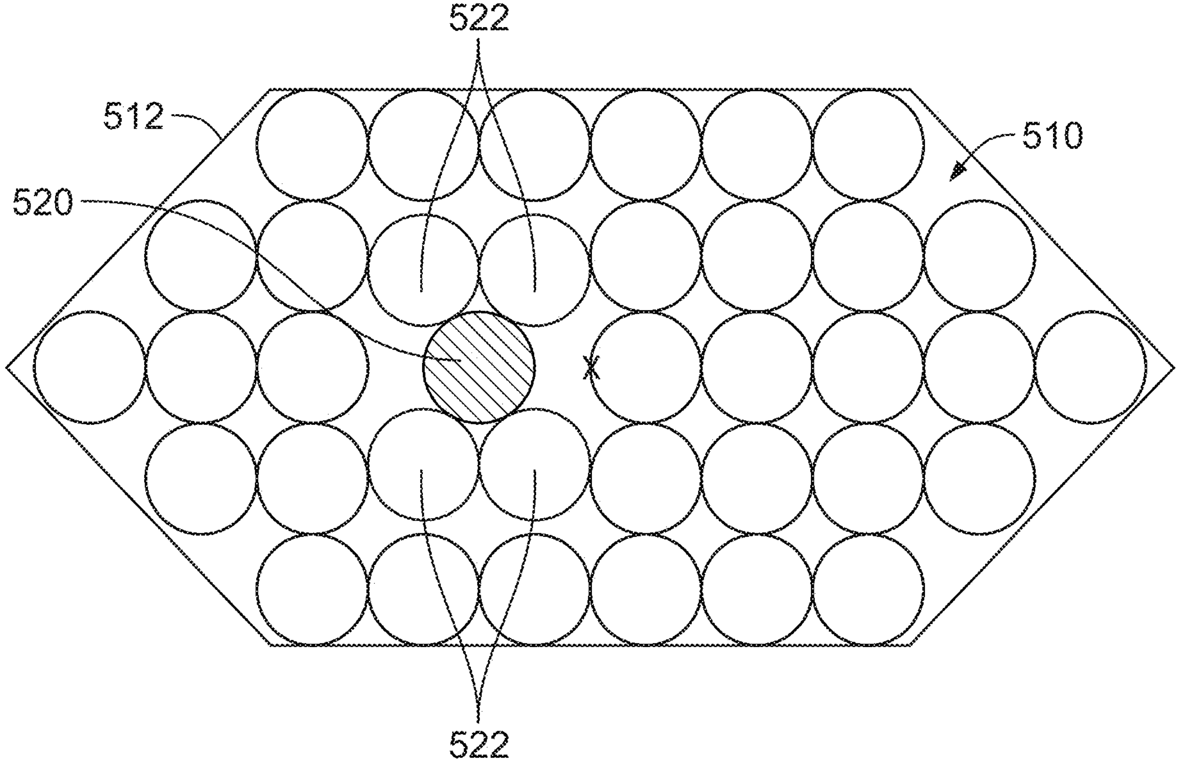

In some examples, the virtual navigation application may create an unoccupied position in the cluster that meets the avatar spacing requirements by moving or nudging one or more avatars in the cluster. FIGS. 5A and 5B illustrate how the process of creating an unoccupied position is done. As shown in FIG. 5A, the virtual navigation application may determine that position 520 would meet the avatar spacing requirements if avatars 522 are moved slightly out of the way. FIG. 5A shows a cluster 510 with a bounding polygon 512, and a target position 520. However, the target position 520 in FIG. 5A is not available, because avatars 522 are spaced too close, such that there is not enough room to insert another avatar. The virtual navigation application may be configured to determine that a suitable position would be available if avatars 522 are moved. The virtual navigation application may then be configured to reposition avatars 522 forward and backward as shown in FIG. 5B, thereby creating an opening at position 520 for an avatar to be added to the cluster.

In some examples, the virtual navigation application may be configured to carry out several levels or rounds of movement and nudging. The virtual navigation application may move the inner layer comprising avatars 522 to create room for another avatar at position 520. And if movement of the inner layer of avatars 522 causes avatars 522 to overlap with a second layer of avatars (not labeled), the virtual navigation application may then nudge the second layer of avatars slightly outward as well. This process may continue with successive layers of avatars until there is no overlapping and all avatar spacing requirements are met. In some examples, the virtual navigation application may operate this nudging process with certain constraints. For example, the virtual navigation application may be prevented from nudging too many avatars (e.g., a limit of 5, 10, or some other number of avatars). Additionally, the virtual navigation application may be constrained to only nudge some number of layers of avatars (e.g., only moving one or two layers). In one example, the virtual navigation application is configured to only nudge those avatars directly adjacent to the position where the avatar is potentially being inserted (e.g., the virtual navigation application only moves avatars 522 proximate to position 520, while being prevented from moving any other avatars in the cluster).

The virtual navigation application may consider a number of other factors in determining or identifying an unoccupied position of the cluster. For example, the virtual navigation application may avoid identifying any position that, if filled by the avatar, would obstruct the view of an existing avatar in the cluster. Additionally, the virtual navigation application may consider the positions of environmental objects, and other locked out or unavailable positions. For instance, a front row of an event may be deemed a VIP section, and may require registration or special status to access. The virtual navigation application may inform users about one-time or repeated events to enable the users to make a reservation in advance.

In some examples, the virtual navigation application may consider the size and/or shape of the event or object of interest. Where an event has a large footprint, there may be a greater number of positions that have a wide viewing angle, as opposed to a small event that has fewer positions that have a wide viewing angle. In some examples, the spacing between avatars within the cluster may differ based on a distance from the event or object of interest. For instance, positions closer to the event may be tightly packed, whereas positions farther away from the event may be spaced apart more from each other. Additionally, the spacing between avatars can be dynamic as avatars move, dance, engage with each other, and otherwise interact. As a result, the virtual navigation application may identify one or more unoccupied positions in the cluster based on all this information, and may deem one or more positions unoccupied or not based on a prediction of the spacing over time. For instance, where a user has a preference for a large spacing requirement, the virtual navigation application may deem an otherwise available position to be inaccessible based on the position's proximity to avatars who are likely to move and crowd the position. The virtual navigation application may predict the movement of one or more avatars, or the cluster as a whole, in order to better identify unoccupied positions that will be acceptable to the user.

After identifying one or more unoccupied positions, the virtual navigation application may be configured to reposition the avatar from the first position of the 3D virtual environment to the identified unoccupied position in the cluster. As noted above, the virtual navigation application may jump or teleport the avatar into the unoccupied position. As shown in FIGS. 1A, 1B, 2, 4, 5A, 5B, and 6, the unoccupied position in the cluster may be blocked by other avatars, such that no traversable path from the avatar's first position to the unoccupied position in the cluster is available. In some examples, when repositioning the avatar, the avatar does not pass through space in the 3D virtual environment, but simply jumps to the unoccupied position. In some examples, the virtual navigation application may present a user interface element with a countdown indicating when the jump will take place. In some examples, the virtual navigation application may present a user interface element with an option to cancel the jump.

In some examples, the virtual navigation application may be configured to provide a user interface element allowing the user to restart an event that is already in progress. If the virtual navigation application determines that the cluster of avatars are observing an event already in progress, the virtual navigation application may present a selectable user interface input option to restart the event either before or after the avatar is repositioned in the cluster. The restart may be specific to the avatar, such that the avatar views the event asynchronously with respect to other members of the cluster. That is, each member of the cluster may view the same event, but at a different time. Alternatively, the event may be restarted for all members or a group of members of the cluster, such that all or the group of members have a synchronized viewing of the event. The virtual navigation application may present a user interface element to one or more of the members of the cluster, who may vote on whether to restart the event or not. If a threshold number of members of the cluster or group choose to restart, the event may be restarted for the whole cluster or the group.

In some examples, the virtual navigation application may be configured to orient the avatar in the cluster. The avatar may be oriented (or an orientation may be determined) either before or after the avatar is repositioned in the cluster. Determining the orientation can include setting the view direction, setting the body position of the avatar, or otherwise orienting the avatar based on one or more factors.

Figure 6:
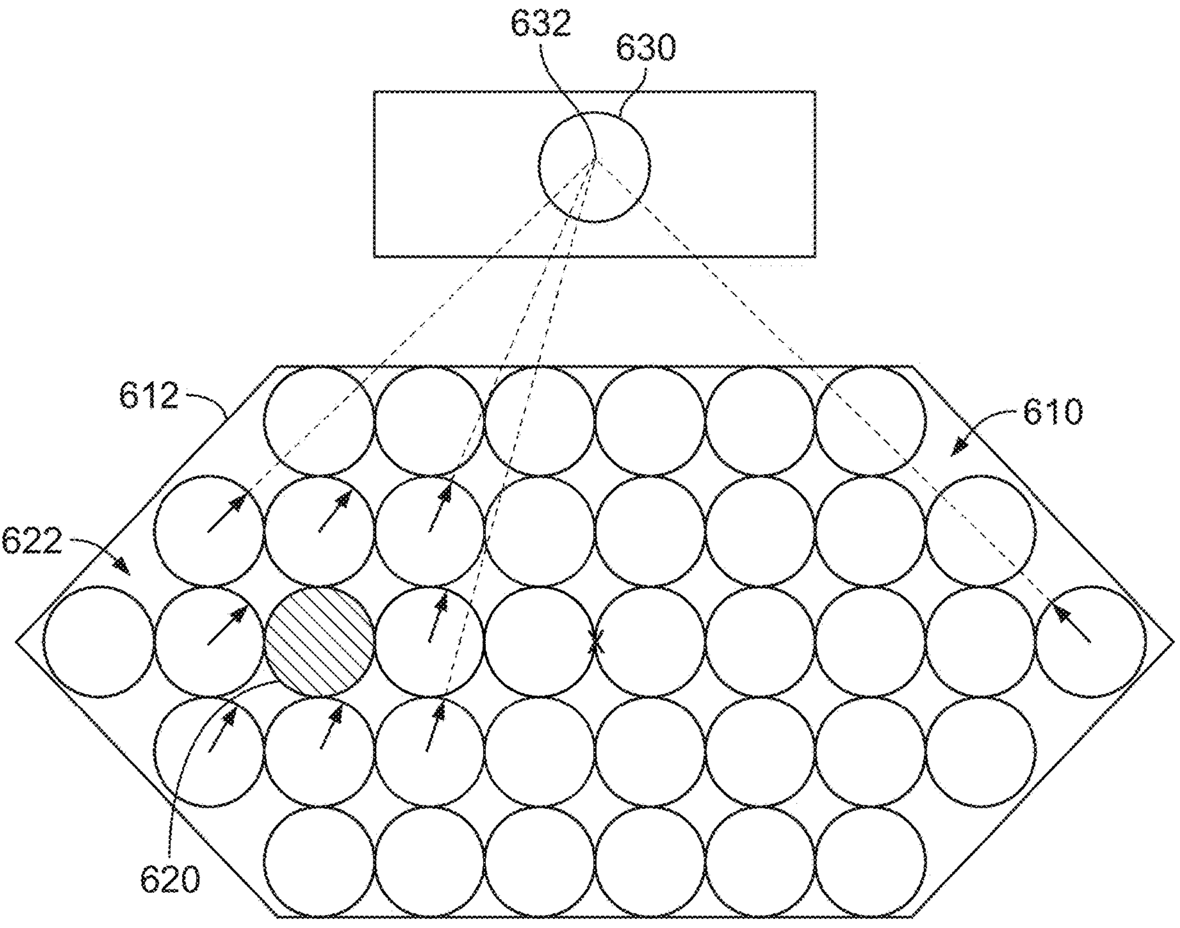
FIG. 6 shows a simplified diagram of an example avatar repositioned into the cluster, and showing the orientation of several avatars of the cluster, in accordance with some embodiments of this disclosure.

FIG. 6 illustrates how orientation of the avatar may be determined according to some embodiments. FIG. 6 illustrates a cluster 610, an unoccupied position 620 surrounded by several proximate avatars 622, and a performer 630 on a stage in front of the cluster. The virtual navigation application may determine an orientation for the avatar joining the cluster 610 based on the orientation or view direction of other members of the cluster, based on the position of the event or performer.

In one example, the virtual navigation application determines the orientation for the avatar joining the cluster based on a mean orientation of the members of the cluster proximate the avatar. In FIG. 6, the orientation of the avatar joining the cluster at position 620 may be determined as the mean orientation of the nine proximate avatars 622 surrounding position 620. Alternatively, a median direction may be used, or some other combination of the orientations of the proximate avatars 622.

In another example, the virtual navigation application may determine the orientation for the avatar joining the cluster based on an intersection point of the view angles of the members of the cluster. The virtual navigation application may use only the proximate avatars 622, or may use all or some other group of avatars of the cluster. As shown in FIG. 6, the virtual navigation application determines the intersection point 632 of the view directions of several members of the cluster 610. The virtual navigation application may then orient the avatar joining the cluster at position 620 toward that intersection point 632. This technique may be particularly useful in a situation where the cluster is not associated with an event having a known location. Instead, the virtual navigation application directs the avatar joining the cluster toward the object of interest by determining where the members of the cluster are all looking based on the intersection point of their respective views.

In another example, the cluster is associated with or corresponds to an event or performer having a known location. The virtual navigation application may orient the avatar joining the cluster toward the known location of the event or performer.

In some examples, the virtual navigation application may determine the orientation of the avatar after repositioning the avatar in the cluster. In other examples, the virtual navigation application may determine the orientation of the avatar before repositioning the avatar in the cluster.

The virtual navigation application may determine and present a preview for one or more of the determined unoccupied positions in the cluster. In these cases, the virtual navigation application may present the preview of the avatar view from the unoccupied position in the cluster before repositioning the avatar, to enable the user to see what the avatar's view will be if and when it is repositioned to the cluster. The user may be presented with a single preview, multiple previews, or a series of previews (i.e., scrolling through a carousel) depending on the number of identified unoccupied positions in the cluster. The user may then select a particular unoccupied position based on the preview of the desired position in the cluster.

Figure 7:
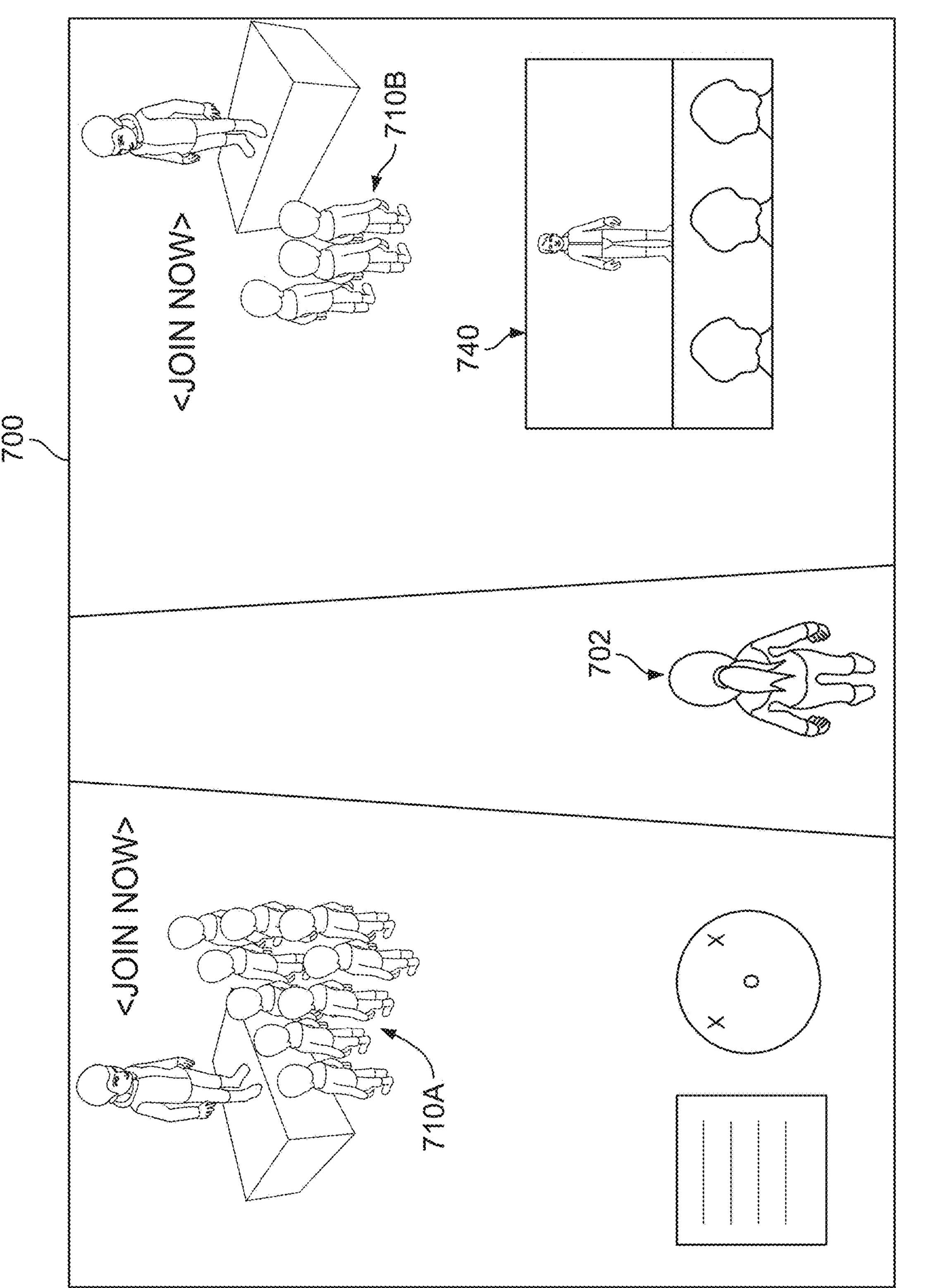
FIG. 7 shows an example display of an avatar in a 3D virtual environment, and a preview of the avatar's view if the avatar were to join a cluster of avatars, in accordance with some embodiments of this disclosure.

FIG. 7 illustrates an example display 700, showing clusters 710A and 710B. If the user selects cluster 710A, the virtual navigation application may present preview 740 showing a preview 740 of the view of the avatar if repositioned in cluster 710A. The virtual navigation application may also present a user interface element that enables the user to scroll through previews for multiple unoccupied positions in the cluster.

In some examples, the virtual navigation application may enable one or more group options. For example, some clusters may be deemed unjoinable or off limits to avatars that are not part of a particular group. In this case, only members of the group may be able to identify the cluster, determine an unoccupied position with the cluster, and join the cluster.

In some examples, the virtual navigation application may be configured to change a sizing of the avatar to enable positions in the cluster to become available. For instance, the virtual navigation application may shrink the avatar to place it in a position in the cluster if the position is just slightly smaller than required (e.g., within some threshold of the spacing requirement). The virtual navigation application may then return the avatar to its prior size when space becomes available.

In some examples, the user input to execute a jump to the cluster may be a single button. In this case, the virtual navigation application may reposition the avatar to the nearest cluster factoring in the view direction or orientation of the avatar (i.e., jumping to the cluster that is most closely aligned with the view direction of the avatar). No further input may be required, other than the single jump input. Alternatively, in some examples, the virtual navigation application may require two or more user inputs to execute a jump. Activating the jump button in conjunction with a directional button, gesture, or input, may cause the virtual navigation application to jump the avatar to a position in the next cluster of participants in the selected direction. For example, if the user presses a forward button (or equivalently moves a thumb controller in a forward direction) to move forward, and also presses the jump button, the virtual navigation application may responsively jump the avatar to the cluster that most closely aligns with the forward direction input.

This disclosure includes examples and descriptions that detail features within a 3D virtual environment. For the sake of explanation, the 3D virtual environment may be described as being entirely virtual. However, in some examples, the disclosure may also pertain to mixed reality environments that have a virtual element, such as an augmented reality environment. In one example, a sporting event (e.g. NBA game) may operate in real life, and may include a virtual element wherein users can "attend" the real-life event through the eyes of their avatar. The arena hosting the real-life event may include specific areas or places having cameras which act as the eyes of the avatars. In these examples, there may be multiple cameras and possible avatar positions, and users may be able to navigate through the arena and between groups of avatars and real-world attendees using the same or similar techniques described herein.

Figure 8:
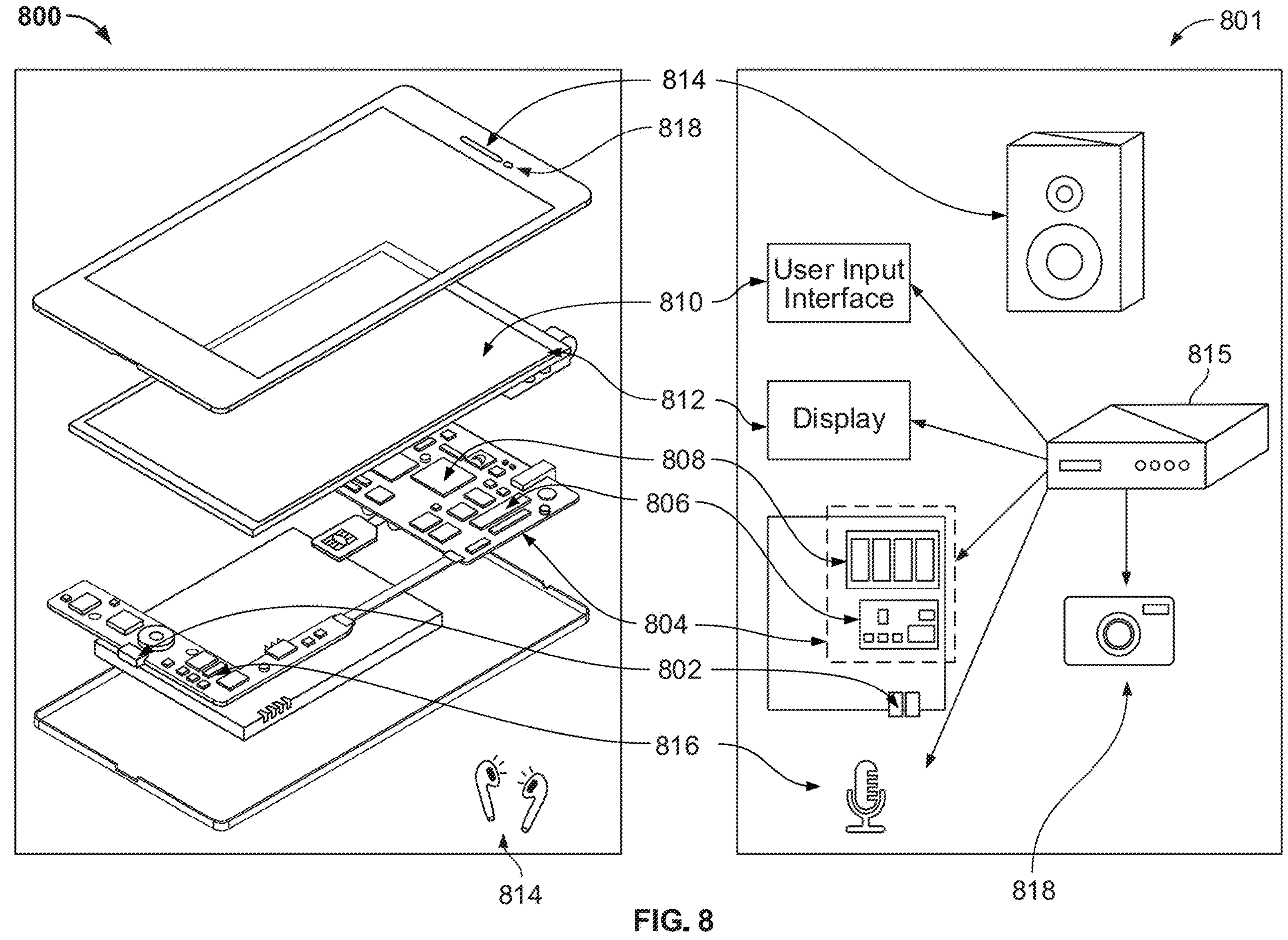
FIG. 8 shows generalized embodiments of illustrative user equipment devices which may perform the functions described herein.
Figure 9:
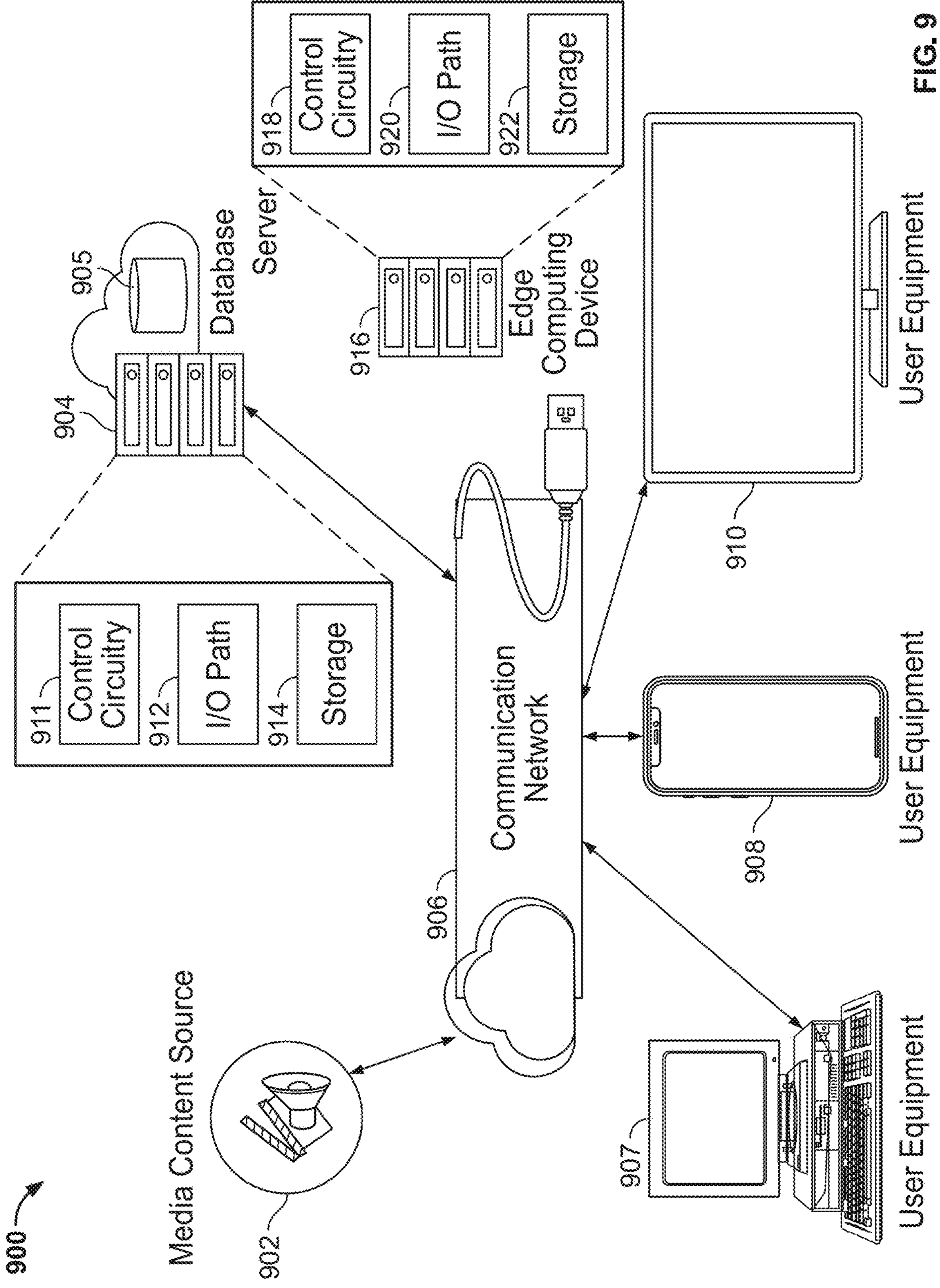
FIG. 9 is a diagram of an illustrative system which may perform the functions described herein.

FIGS. 8-9 depict illustrative devices, systems, servers, and related hardware for virtual navigation. FIG. 8 shows generalized embodiments of illustrative user equipment devices which may perform the functions described herein. User equipment device 800 may be a smartphone device, a tablet, a virtual reality or augmented reality device, or any other suitable device capable of processing video data. In another example, user equipment device 801 may be a user television equipment system or device. User television equipment device 801 may include set-top box 815. Set-top box 815 may be communicatively connected to microphone 816, audio output equipment (e.g., speaker or headphones 814), and display 812. In some embodiments, display 812 may be a television display, computer display, or a head mounted display comprising one or more displays for each eye, a stack of displays, or varifocal displays. In some embodiments, display 812 may contain a spatial light modulator (SLM) device. In some embodiments, set-top box 815 may be communicatively connected to user input interface 810. In some embodiments, user input interface 810 may be a remote-control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 800 and user equipment device 801 may receive content and data via input/output (I/O) path (e.g., circuitry) 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 9 for illustration, any suitable computing device having processing circuitry, control circuitry, and storage may be used in accordance with the present disclosure. For example, set-top box 915 may be replaced by, or complemented by, a personal computer (e.g., a notebook, a laptop, a desktop), a smartphone (e.g., device 900), a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the virtual navigation application stored in memory (e.g., storage 808). Specifically, control circuitry 804 may be instructed by the virtual navigation application to perform the functions discussed above and below. In some implementations, processing or actions performed by control circuitry 804 may be based on instructions received from the virtual navigation application.

In client/server-based embodiments, control circuitry 804 may include communications circuitry suitable for communicating with a server or other networks or servers. The virtual navigation application may be a stand-alone application implemented on a device or a server. The virtual navigation application may be implemented as software or a set of executable instructions. The instructions for performing any of the embodiments discussed herein of the virtual navigation application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the virtual navigation application may be a client/server application where only the client application resides on device 800, and a server application resides on an external server (e.g., server 904 and/or server 916). For example, the virtual navigation application may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 904 and/or edge computing device 916), referred to as "the cloud." Device 900 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904 or 916, the image processing application may instruct control circuitry 911 or 918 to perform processing tasks for the client device.

Control circuitry 804 may include communications circuitry suitable for communicating with a server, edge computing systems and devices, a table or database server, or other networks or servers. The instructions for carrying out the above-mentioned functionality may be stored on a server (which is described in more detail in connection with FIG.

9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as virtual navigation application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, gesture controller (e.g., a remote associated with a VR headset), or other user input interfaces. Display 812 may be provided as a stand-alone device or integrated with other elements of each one of user equipment device 800 and user equipment device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, SLM head mounted display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The virtual navigation application may be implemented using any suitable architecture. For example, it may be a stand-alone application wholly implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide encoding/decoding functionality and preform any of the actions discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the virtual navigation application is a client/server-based application. Data for use by a thick or thin client implemented on each one of user equipment device 800 and user equipment device 801 may be retrieved on-demand by issuing requests to a server remote to each one of user equipment device 800 and user equipment device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the virtual navigation application may be downloaded and interpreted or otherwise run by an interpreter or virtual machine (run by control circuitry 804). In some embodiments, the image processing application may be encoded in the ETV Binary Interchange Format (EBIF), received by control circuitry 804 as part of a suitable feed, and interpreted by a user agent by running on control circuitry 804. For example, the virtual navigation application may be an EBIF application. In some embodiments, the virtual navigation application may be defined by a series of JAVA-based files that are received and run by a local virtual machine or other suitable middleware executed by control circuitry 804.

FIG. 9 is a diagram of an illustrative system 900 for virtual navigation, in accordance with some embodiments of this disclosure. User equipment devices 907, 908, 910 (e.g., which may correspond to one or more of computing device 800 or 801 may be coupled to communication network 906). Communication network 906 may be one or more networks including the Internet, a mobile phone network, mobile voice, or data network (e.g., a 5G, 4G, or LTE network), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 906.

System 900 may comprise media content source 902, one or more servers 904, and one or more edge computing devices 916 (e.g., included as part of an edge computing system). In some embodiments, the virtual navigation application may be executed at one or more of control circuitry 911 of server 904 (and/or control circuitry of user equipment devices 907, 908, 910 and/or control circuitry 918 of edge computing device 916).

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide encoding/decoding data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 to one or more communications paths. I/O path 912 may comprise networking circuitry for sending data over network 906 in any suitable format. For example, networking circuitry may comprise hardware such as a network card or network controller for sending and receiving packets of data over the Internet.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Edge computing device 916 may comprise control circuitry 918, I/O path 920 and storage 922, which may be implemented in a similar manner as control circuitry 911, I/O path 912 and storage 924, respectively of server 904. Edge computing device 916 may be configured to be in communication with one or more of user equipment devices 907, 908, 910 and video server 904 over communication network 906, and may be configured to perform processing tasks. In some embodiments, a plurality of edge computing devices 916 may be strategically located at various geographic locations, and may be mobile edge computing devices configured to provide processing support for mobile devices at various geographical regions.

Figure 10:
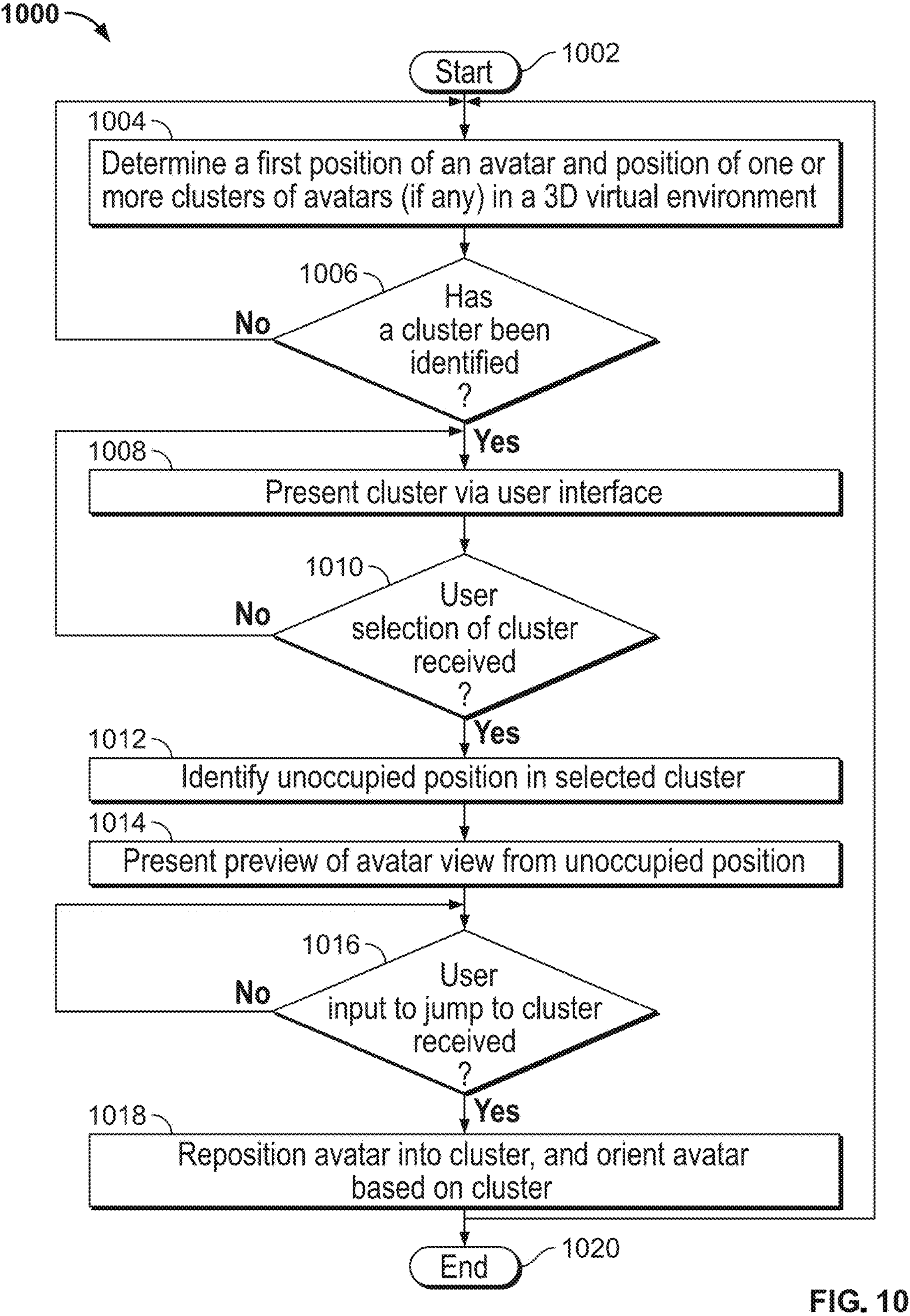
FIG. 10 is a flowchart of an illustrative process for repositioning an avatar into a cluster of avatars, in accordance with some embodiments of this disclosure.

FIG. 10 is a flowchart of an illustrative process 1000 for navigating in a 3D virtual environment, in accordance with some embodiments of this disclosure. In various embodiments, the individual steps of process 1000 may be implemented by one or more components of the devices and systems of FIGS. 8-9. Although the present disclosure may describe certain steps of the process (and of other processes described herein) as being implemented by certain components of the devices and systems of FIGS. 8-9, this is for purposes of illustration only, and it should be understood that other components of the devices and systems of FIGS. 8-9 may implement those steps instead. Additionally, certain steps of the process 1000 are described as occurring in a particular order. However, it should be understood that the steps of process 1000 may be carried out in a different order, one or more steps may be removed, and/or one or more steps may be added.

At step 1002, process 1000 begins.

At step 1004, control circuitry (e.g., control circuitry 804, 911, or 918 of FIGS. 8 and 9) determines a first position of an avatar, and the position of one or more clusters of avatars in a 3D virtual environment.

At step 1006, the control circuitry determines whether one or more clusters have been identified. If no cluster has been identified, the process 1000 proceeds back to step 1004, to determine the position of the first avatar and the one or more clusters. If the control circuitry determines that a cluster has been identified, the process proceeds to step 1008.

At step 1008, the process 1000 includes input/output circuitry (I/O circuitry) presenting the one or more identified clusters to the user via a user interface. The I/O circuitry may present the one or more identified clusters along with various related information such as, for example, an identifier, a direction, a distance, a corresponding event or object of interest, any friends or contacts that are a part of the cluster, and whether the cluster is joinable. The I/O circuitry may present this information to the user in the form of a list or a map view (e.g., FIG. 1C), a selectable icon (e.g., FIG. 1A), or via any other suitable user interface element such as those described above.

At step 1010, the I/O circuitry and/or control circuitry determines whether a user selection of a cluster has been received. The user selection of a cluster can include selection via a user interface, such as a controller, mouse and keyboard, gesture, and any other suitable user input mechanism described above. If no user input selection of a cluster is received, the process 1000 proceeds to step 1008 to continue presenting the identified clusters to the user.

If a user selection is received at step 1010, step 1012 includes the control circuitry identifying one or more unoccupied positions in the selected cluster. This may include identifying and ranking one or more unoccupied positions, as described above with respect to FIGS. 2, 3, 4, 5A, and 5B.

At step 1014, the I/O circuitry presents a preview of the avatar view from the identified unoccupied position. Once one or more unoccupied positions in the selected cluster are determined, the control circuitry may determine a preview for each unoccupied position. The preview includes what the avatar view would be if the avatar were to be repositioned in the unoccupied position.

At step 1016, the control circuitry and/or I/O circuitry determine whether a user input to jump to the identified cluster has been received. The user input may be separate from the selection of the cluster in step 1010, or may be a part of the selection at step 1010 (i.e., the user may simultaneously select the cluster and request to jump to the cluster at step 1010). Alternatively, the I/O circuitry may receive a separate input from the user, requesting that the avatar be repositioned in the identified cluster. As noted above, this input may be in the form of a selection of an icon, a button press, a voice input, a gesture, or any other suitable user input.

At step 1018, the control circuitry repositions the avatar in the identified cluster, and orients the avatar based on the cluster. The control circuitry may orient the avatar based on the orientations of the other avatars in the cluster, or based on the position of an event or object of interest corresponding to the cluster.

The process 1000 may then continue back to step 1004, wherein additional clusters may be identified to allow the user to jump to another cluster. Alternatively, the process 1000 may end at step 1020 if the user is satisfied by joining the identified cluster.

The process discussed above are intended to be illustrative and not limiting. One skilled in the art would appreciate that the steps of the process discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The terminology used herein is for the purpose of describing particular embodiments only and is not intended to be limiting of the disclosure.

Throughout the present disclosure, the term "3D virtual environment" includes without limitation extended reality (XR), augmented reality (AR), 3D content, 4D experiences, next-gen UIs, virtual reality (VR), mixed reality experiences, interactive experiences, a combination of the same, and the like.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

What is claimed is:

1. A method comprising:

generating for display an avatar in a first position of a 3D virtual environment;

identifying a cluster of avatars in the 3D virtual environment, wherein the cluster of avatars is located in a second position different from the first position of the avatar;

determining, based on the first position and an orientation of the avatar in the first position, a first viewing angle of the avatar in the first position;

determining, based on the first position and the second position, a cluster angle defining the angular direction from the first position to the second position;

based on determining that the first viewing angle of the avatar is within a threshold angular range of the cluster angle, presenting a selectable user interface input option indicating that repositioning the avatar from the first position to the cluster is available; and based on receiving a selection of the selectable user interface input option to reposition the avatar from the first position to the cluster of avatars:

identifying an identified unoccupied position in the cluster; and repositioning the avatar from the first position of the 3D virtual environment to the identified unoccupied position in the cluster.

2. The method of claim 1, wherein during the repositioning the avatar does not pass through space in the 3D virtual environment between the first position and the identified unoccupied position in the cluster.

3. The method of claim 1, wherein all traversable paths in the 3D virtual environment extending between the first position and the identified unoccupied position in the cluster are blocked.

4. The method of claim 1, wherein the identified unoccupied position in the cluster is an edge of the cluster.

5. The method of claim 1, further comprising:

in response to identifying the cluster of avatars in the 3D virtual environment, generating for display a user interface element indicating that the cluster is available to join;

wherein receiving the selection of the selectable user interface input option to reposition the avatar from the first position to the cluster of avatars comprises receiving a selection of the user interface element indicating that the cluster is available to join.

6. The method of claim 1, wherein presenting the selectable user interface input option indicating that repositioning the avatar from the first position to the cluster is available comprises presenting an overhead map view showing the first position relative to the second position.

7. The method of claim 1, wherein the selectable user interface input option comprises one of a button moving the orientation of the avatar in the direction of the cluster or a movement of a view direction of the avatar in the direction of the cluster.

8. The method of claim 1, wherein presenting the selectable user interface input option indicating that repositioning the avatar from the first position to the cluster is available comprises one or more of (a) an audio output, (b) a graphical output, or (c) a tactile output.

9. The method of claim 8, wherein receiving the selection of the selectable user interface input option to reposition the avatar from the first position to the cluster of avatars comprises one or more of (a) receiving an audio input comprising the selection of the selectable user interface input option, (b), receiving a graphical input comprising the selection of the selectable user interface input option, or (c) receiving a tactile input comprising the selection of the selectable user interface input option.

10. The method of claim 1, wherein identifying the cluster of avatars comprises identifying the cluster of avatars based on a user preference associated with the first avatar, the user preference including one or more of (a) a preferred event type associated with the cluster, (b) a preferred feature associated with the cluster, or (c) a preferred avatar associated with the cluster.

11. The method of claim 1, further comprising identifying the identified unoccupied region in the cluster based on a user preference associated with the first avatar, the user preference including a preferred proximity to other avatars.

12. The method of claim 1, further comprising:

determining that one or more avatars of the cluster are observing an event already in progress; and presenting a selectable user interface input option to restart the event.

13. The method of claim 1, further comprising:

determining that the cluster is associated with an event or object of interest; and in response to determining a position of the event or object of interest, orienting the avatar in the identified unoccupied position toward the position of the event or object of interest.

14. The method of claim 1, further comprising:

determining the orientations of one or more avatars of the cluster proximate the identified unoccupied position; and orienting the avatar in the identified unoccupied position by (a) orienting the avatar in a mean orientation of the one or more avatars of the cluster proximate the identified unoccupied position, (b) orienting the avatar in a median orientation of the one or more avatars of the cluster proximate the identified unoccupied position, or (c) orienting the avatar toward a mean intersection point of respective view vectors of the one or more avatars of the cluster proximate the identified unoccupied position.

15. The method of claim 1, wherein identifying the identified unoccupied position in the cluster comprises:

determining a plurality of unoccupied positions in the cluster;

ranking the plurality of unoccupied position based on a user preference, the user preference including one or more of (a) a preferred proximity to other avatars, or (b) a preferred viewing angle of an event or object of interest corresponding to the cluster; and designating a best-ranked unoccupied position as the identified unoccupied position.

16. The method of claim 1, further comprising:

in response to identifying the identified unoccupied position in the cluster and prior to repositioning the avatar from the first position of the 3D virtual environment to the identified unoccupied position in the cluster, providing a preview of a view of the avatar from the identified unoccupied position.

17. The method of claim 1, further comprising:

identifying a plurality of target clusters, each having a respective centroid;

in response to receiving the user interface input request to place the avatar into the cluster of avatars, determining a first cluster of the plurality of target clusters having a centroid that most closely aligns with a view direction of the avatar;

identifying a first identified unoccupied position in the first cluster; and repositioning the avatar from the first position of the 3D virtual environment to the first identified unoccupied position in the first cluster.

18. A system comprising:

input/output circuitry configured to:

generate for display an avatar in a first position of a 3D virtual environment; and control circuitry configured to:

identify a cluster of avatars in the 3D virtual environment, wherein the cluster of avatars is located in a second position different from the first position of the avatar;

determine, based on the first position and an orientation of the avatar in the first position, a first viewing angle of the avatar in the first position;

determine, based on the first position and the second position, a cluster angle defining the angular direction from the first position to the second position;

based on determining that the first viewing angle of the avatar is within a threshold angular range of the cluster angle, present a selectable user interface input option indicating that repositioning the avatar from the first position to the cluster is available; and based on receiving selection of the selectable user interface input option to reposition the avatar from the first position to the cluster of avatars:

identify an identified unoccupied position in the cluster; and reposition the avatar from the first position of the 3D virtual environment to the identified unoccupied position in the cluster.

19. The system of claim 18, wherein during the repositioning the avatar does not pass through space in the 3D virtual environment between the first position and the identified unoccupied position in the cluster.

* * * * *